US 7,805,335 B2

(12) United States Patent
Wittmer et al.

(10) Patent No.: US 7,805,335 B2
(45) Date of Patent: Sep. 28, 2010

(54) PURCHASE LIST HAVING STATUS INDICATORS

(75) Inventors: Holger Wittmer, Riegelsberg (DE); Andreas Freitag, Saarbrücken (DE)

(73) Assignee: SAP AG, Walldorf (DE)

( * ) Notice: Subject to any disclaimer, the term of this patent is extended or adjusted under 35 U.S.C. 154(b) by 1093 days.

(21) Appl. No.: 10/903,867

(22) Filed: Jul. 30, 2004

(65) Prior Publication Data

US 2005/0216357 A1   Sep. 29, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 30/00* (2006.01)
*G06F 17/30* (2006.01)
*G06F 17/50* (2006.01)

(52) U.S. Cl. .................... 705/26; 705/27; 705/29
(58) Field of Classification Search ............... 705/28
See application file for complete search history.

(56) References Cited

U.S. PATENT DOCUMENTS

| | | | |
|---|---|---|---|
| 4,750,119 A | 6/1988 | Cohen et al. | |
| 4,752,877 A | 6/1988 | Roberts et al. | |
| 5,297,250 A | * 3/1994 | Leroy et al. | 715/763 |
| 5,315,508 A | 5/1994 | Bain et al. | |
| 5,325,304 A | 6/1994 | Aoki | |
| 5,400,253 A | 3/1995 | O'Connor | |
| 5,500,513 A | 3/1996 | Langhans et al. | |
| 5,615,109 A | 3/1997 | Eder | |
| 5,621,201 A | 4/1997 | Langhans et al. | |
| 5,710,578 A | 1/1998 | Beauregard et al. | |
| 5,758,327 A | 5/1998 | Gardner et al. | |
| H1743 H | 8/1998 | Graves et al. | |
| 5,796,614 A | 8/1998 | Yamada | |

(Continued)

FOREIGN PATENT DOCUMENTS

JP   2004-030343 A   1/2004

(Continued)

OTHER PUBLICATIONS

U.S. Appl. No. 60/374,892, filed Apr. 22, 2002, Krajec, Russell S.

(Continued)

*Primary Examiner*—F. Ryan Zeender
*Assistant Examiner*—Faris Almatrahi
(74) *Attorney, Agent, or Firm*—Foley & Lardner LLP

(57) ABSTRACT

A method of indicating the status of items in one or more databases includes displaying a list of items of interest, and displaying a visual status indicator for each of the items in the list of items of interest, wherein the visual status indicator is configured to indicate the status of the item of interest. A system for indicating the status of items in one or more databases includes means for displaying a list of items of interest, and means for displaying a visual status indicator for each of the items in the list of items of interest, wherein the visual status indicator is configured to indicate the status of the item of interest.

30 Claims, 10 Drawing Sheets

U.S. PATENT DOCUMENTS

| | | |
|---|---|---|
| 5,832,496 A | 11/1998 | Anand et al. |
| 5,870,716 A | 2/1999 | Sugiyama et al. |
| 5,878,400 A | 3/1999 | Carter, III |
| 5,920,846 A | 7/1999 | Storch et al. |
| 5,930,769 A | 7/1999 | Rosengard |
| 5,930,771 A | 7/1999 | Stapp |
| 5,943,652 A | 8/1999 | Sisley et al. |
| 5,953,707 A | 9/1999 | Huang et al. |
| 5,999,914 A | 12/1999 | Blinn et al. |
| 6,014,648 A | 1/2000 | Brennan |
| 6,029,139 A | 2/2000 | Cunningham et al. |
| 6,064,984 A * | 5/2000 | Ferguson et al. .......... 705/36 R |
| 6,115,690 A * | 9/2000 | Wong ............................. 705/7 |
| 6,151,588 A | 11/2000 | Tozzoli et al. |
| 6,185,550 B1 | 2/2001 | Snow et al. |
| 6,260,024 B1 | 7/2001 | Shkedy |
| 6,285,916 B1 | 9/2001 | Kadaba et al. |
| 6,341,351 B1 | 1/2002 | Muralidhran et al. |
| 6,366,890 B1 | 4/2002 | Usrey |
| 6,473,794 B1 | 10/2002 | Guheen et al. |
| 6,484,149 B1 | 11/2002 | Jammes et al. |
| 6,505,093 B1 | 1/2003 | Thatcher et al. |
| 6,507,851 B1 | 1/2003 | Fujiwara et al. |
| 6,647,380 B1 | 11/2003 | Yotsukura |
| 6,671,676 B1 | 12/2003 | Shacham |
| 6,701,299 B2 | 3/2004 | Kraisser et al. |
| 6,721,715 B2 | 4/2004 | Nemzow |
| 6,725,204 B1 | 4/2004 | Gusley |
| 7,082,426 B2 | 7/2004 | Musgrove et al. |
| 6,868,528 B2 | 3/2005 | Roberts |
| 6,910,017 B1 | 6/2005 | Woo et al. |
| 6,980,966 B1 | 12/2005 | Sobrado et al. |
| 7,016,859 B2 | 3/2006 | Whitesage |
| 7,080,030 B2 * | 7/2006 | Eglen et al. .................... 705/26 |
| 7,082,408 B1 | 7/2006 | Baumann et al. |
| 7,092,929 B1 | 8/2006 | Dvorak et al. |
| 7,096,189 B1 | 8/2006 | Srinivasan |
| 7,107,268 B1 | 9/2006 | Zawadzki et al. |
| 7,117,165 B1 | 10/2006 | Adams et al. |
| 7,124,098 B2 * | 10/2006 | Hopson et al. ................ 705/26 |
| 7,124,984 B2 | 10/2006 | Yokouchi et al. |
| 7,139,731 B1 | 11/2006 | Alvin |
| 7,188,080 B1 | 3/2007 | Walker et al. |
| 7,216,086 B1 | 5/2007 | Grosvenor et al. |
| 7,283,975 B2 * | 10/2007 | Broughton ................... 705/28 |
| 7,343,315 B2 | 3/2008 | Wittmer et al. |
| 7,346,656 B2 | 3/2008 | Worthen |
| 7,499,877 B2 | 3/2009 | Carr et al. |
| 7,516,083 B1 | 4/2009 | Dvorak et al. |
| 7,523,048 B1 | 4/2009 | Dvorak |
| 2001/0011295 A1 | 8/2001 | Kobayashi et al. |
| 2001/0013731 A1 | 8/2001 | Shinohara et al. |
| 2001/0019332 A1 | 9/2001 | Fisher |
| 2001/0019778 A1 | 9/2001 | Gardaz et al. |
| 2001/0032130 A1 | 10/2001 | Gabos et al. |
| 2001/0034673 A1 | 10/2001 | Yang et al. |
| 2001/0039517 A1 | 11/2001 | Kawakatsu |
| 2001/0049634 A1 | 12/2001 | Stewart |
| 2002/0012390 A1 | 1/2002 | Kim |
| 2002/0013731 A1 | 1/2002 | Bright et al. |
| 2002/0019778 A1 | 2/2002 | Isaacson et al. |
| 2002/0023500 A1 | 2/2002 | Chikuan et al. |
| 2002/0026368 A1 | 2/2002 | Carter, III |
| 2002/0048369 A1 | 4/2002 | Ginter et al. |
| 2002/0059108 A1 | 5/2002 | Okura et al. |
| 2002/0059122 A1 | 5/2002 | Inoue et al. |
| 2002/0062314 A1 | 5/2002 | Hisasue et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0099563 A1 | 7/2002 | Adendorff et al. |
| 2002/0099579 A1 | 7/2002 | Stowell et al. |
| 2002/0107713 A1 | 8/2002 | Hawkins |
| 2002/0116241 A1 | 8/2002 | Sandhu et al. |
| 2002/0120523 A1 | 8/2002 | Yang |
| 2002/0120533 A1 | 8/2002 | Wiesenmaier |
| 2002/0123930 A1 | 9/2002 | Boyd et al. |
| 2002/0128946 A1 | 9/2002 | Chehade et al. |
| 2002/0138290 A1 | 9/2002 | Metcalfe et al. |
| 2002/0138360 A1 | 9/2002 | Inoue et al. |
| 2002/0143644 A1 | 10/2002 | Tosun et al. |
| 2002/0143690 A1 | 10/2002 | Mahajan et al. |
| 2002/0147622 A1 | 10/2002 | Drolet et al. |
| 2002/0147668 A1 | 10/2002 | Smith et al. |
| 2002/0152128 A1 | 10/2002 | Walch et al. |
| 2002/0156858 A1 | 10/2002 | Hunter |
| 2002/0165782 A1 | 11/2002 | Falkenstein et al. |
| 2002/0184116 A1 | 12/2002 | Tam et al. |
| 2002/0188524 A1 | 12/2002 | Shimizu |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0033231 A1 * | 2/2003 | Turner et al. ................... 705/36 |
| 2003/0046120 A1 | 3/2003 | Hoffman et al. |
| 2003/0046195 A1 | 3/2003 | Mao |
| 2003/0050852 A1 | 3/2003 | Liao et al. |
| 2003/0065574 A1 | 4/2003 | Lawrence |
| 2003/0074269 A1 | 4/2003 | Viswanath |
| 2003/0083961 A1 | 5/2003 | Bezos et al. |
| 2003/0120528 A1 | 6/2003 | Kruk et al. |
| 2003/0126024 A1 | 7/2003 | Crampton et al. |
| 2003/0128392 A1 | 7/2003 | O'Brien et al. |
| 2003/0144916 A1 | 7/2003 | Mumm et al. |
| 2003/0149631 A1 | 8/2003 | Crampton et al. |
| 2003/0149674 A1 | 8/2003 | Good et al. |
| 2003/0158791 A1 | 8/2003 | Gilberto et al. |
| 2003/0171998 A1 | 9/2003 | Pujar et al. |
| 2003/0172007 A1 | 9/2003 | Helmolt et al. |
| 2003/0187767 A1 | 10/2003 | Crites et al. |
| 2003/0200150 A1 | 10/2003 | Westcott et al. |
| 2003/0200156 A1 | 10/2003 | Roseman et al. |
| 2003/0200168 A1 | 10/2003 | Cullen, III et al. |
| 2003/0208365 A1 | 11/2003 | Avery et al. |
| 2003/0229502 A1 | 12/2003 | Woo |
| 2003/0236721 A1 | 12/2003 | Plumer et al. |
| 2004/0006522 A1 | 1/2004 | Keane et al. |
| 2004/0010463 A1 | 1/2004 | Hahn-Carlson et al. |
| 2004/0015367 A1 | 1/2004 | Nicastro et al. |
| 2004/0019528 A1 | 1/2004 | Broussard et al. |
| 2004/0098358 A1 | 5/2004 | Roediger |
| 2004/0122689 A1 | 6/2004 | Dailey et al. |
| 2004/0158507 A1 | 8/2004 | Meek, Jr. et al. |
| 2004/0162763 A1 | 8/2004 | Hoskin et al. |
| 2004/0172321 A1 | 9/2004 | Vemula et al. |
| 2004/0186763 A1 | 9/2004 | Smith |
| 2004/0186765 A1 | 9/2004 | Kataoka |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0249722 A1 | 12/2004 | Sugamura et al. |
| 2004/0267674 A1 | 12/2004 | Feng et al. |
| 2005/0015303 A1 | 1/2005 | Dubin et al. |
| 2005/0055283 A1 | 3/2005 | Zarovinsky |
| 2005/0060270 A1 | 3/2005 | Ramakrishnan |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0086125 A1 | 4/2005 | Cirulli et al. |
| 2005/0096122 A1 | 5/2005 | Nireki et al. |
| 2005/0096125 A1 | 5/2005 | LeMay et al. |
| 2005/0096963 A1 | 5/2005 | Myr et al. |
| 2005/0102175 A1 | 5/2005 | Dudat et al. |
| 2005/0102192 A1 | 5/2005 | Gerrits et al. |
| 2005/0102227 A1 | 5/2005 | Solonchev |

| | | | |
|---|---|---|---|
| 2005/0131807 A1 | 6/2005 | Schaefer et al. | |
| 2005/0165659 A1 | 7/2005 | Gruber | |
| 2005/0171825 A1 | 8/2005 | Denton et al. | |
| 2005/0197912 A1 | 9/2005 | Wittmer et al. | |
| 2005/0197913 A1 | 9/2005 | Grendel et al. | |
| 2005/0197914 A1 | 9/2005 | Welter et al. | |
| 2005/0197918 A1 | 9/2005 | Wittmer et al. | |
| 2005/0197921 A1 | 9/2005 | Abo-Hasna et al. | |
| 2005/0197949 A1 | 9/2005 | Welter et al. | |
| 2005/0203813 A1 | 9/2005 | Welter et al. | |
| 2005/0216325 A1 | 9/2005 | Ziad et al. | |
| 2005/0216357 A1 | 9/2005 | Wittmer et al. | |
| 2005/0216359 A1 | 9/2005 | Welter et al. | |
| 2005/0216375 A1 | 9/2005 | Grendel et al. | |
| 2005/0235020 A1 | 10/2005 | Gabelmann et al. | |
| 2005/0240488 A1 | 10/2005 | Grendel et al. | |
| 2005/0243792 A1 | 11/2005 | Simon et al. | |
| 2005/0246482 A1 | 11/2005 | Gabelmann et al. | |
| 2005/0251734 A1 | 11/2005 | Gabelmann et al. | |
| 2006/0020512 A1 | 1/2006 | Lucas et al. | |
| 2006/0036507 A1 | 2/2006 | Pujar et al. | |
| 2006/0074746 A1 | 4/2006 | Kline et al. | |
| 2006/0074747 A1 | 4/2006 | Kline et al. | |
| 2006/0074748 A1 | 4/2006 | Kline et al. | |
| 2006/0074749 A1 | 4/2006 | Kline et al. | |
| 2006/0074751 A1 | 4/2006 | Kline et al. | |
| 2006/0112099 A1 | 5/2006 | Musgrove et al. | |
| 2006/0184401 A1 | 8/2006 | DelGaudio et al. | |
| 2007/0050272 A1 | 3/2007 | Godlewski et al. | |

FOREIGN PATENT DOCUMENTS

| | | |
|---|---|---|
| WO | WO-99/45450 A2 | 9/1999 |
| WO | WO 01/71635 A2 | 9/2001 |

OTHER PUBLICATIONS

Anon., "(A Lot of) life after H. Ross: Electronic Data Systems," *Financial World*, vol. 162, No. 22, Nov. 9, 1993 (p. 50(2)).

Author unknown, "Staffware: Staffware and Biomni join forces to provide end-to-end e-Procurement solution with enhanced workflow capability; Self-service functionality will enable thousands of transactions to be handled daily from the desktop," *M2 Presswire*, Coventry: Feb. 6, 2001 (p. 1).

"Beyond Markdown Management", *the 4caster*, Iss. 4, vol. 2, summer/autumn 03 (4 pgs.).

Brown, Timothy Charles, "The Effects of Assortment Composition Flexibility on Operating Efficiency" (Abstract only), *Dissertation Abstracts International*, vol. 55/08-A, (p. 2458).

Melcher, Rachel, "Local tech firm creates retail markdown tool", *Cincinnati Business Courier*, Mar. 24, 2000 (3 pgs).

ProfitLogic, available at http://web.archive.org/web/2002060311838/http://profitlogic.com/, available at least by Apr. 15, 2005 (22 pp.).

"Retailers Manage Markdown Challenges Using i2 Solutions" *NFR 92nd Annual Convention & Expo* Jan. 13, 2003, (2 pgs.).

Subrahmanyan et al., "Developing optimal pricing and inventory policies for retailers who face uncertain demand", *Journal of Retailing*, vol. 72, No. 1, Spring, 1996 (p. 7(24)).

Wilson, Glenn T., "Changing the process of production," *Industrial Management*, vol. 37, No. 1, Jan./Feb. 1995 (pp. 1-2).

Abraham et al., "An Implemented System for Improving Promotion Productivity Using Store Scanner Data", Marketing Science, Summer 1993, vol. 12, No. 3, pp. 248-269.

Jensen et al., "Long-Term Construction Contracts: The Impact of Tamra '88 on Revenue Recognition", *Journal of Construction Education*, Spring 1997, vol. 2, No. 1, pp. 37-53.

Srinivasan et al., Concepts and strategy guidelines for designing value enhancing sales promotions, Journal of Product and Brand Management, vol. 7, No. 5, 1998, pp. 410-420.

Kelkar et al., Price Modeling in Standards for Electronic Product Catalogs Based on XML, 2002, pp. 366-375.

Office Action for U.S. Appl. No. 11/047,368, mail date Dec. 20, 2007, 15 pages.

Office Action for U.S. Appl. No. 11/047,368, mail date Jul. 24, 2008, 18 pages.

Office Action for U.S. Appl. No. 11/047,368, mail date Jun. 26, 2007, 14 pages.

Office Action for U.S. Appl. No. 11/047,368, mail date Mar. 4, 2009, 16 pages.

Office Action for U.S. Appl. No. 11/047,368, mail date Nov. 10, 2009, 14 pages.

Office Action for U.S. Appl. No. 11/071,982, mail date Feb. 13, 2009, 18 pages.

Office Action for U.S. Appl. No. 11/071,982, mail date Jan. 25, 2008, 19 pages.

Office Action for U.S. Appl. No. 11/071,982, mail date May 29, 2008, 20 pages.

Office Action for U.S. Appl. No. 11/071,982, mail date Nov. 18, 2008, 7 pages.

Office Action for U.S. Appl. No. 11/072,000 mail date Jul. 17, 2008, 6 pages.

Office Action for U.S. Appl. No. 11/072,000, mail date Dec. 9, 2008, 10 pages.

Office Action for U.S. Appl. No. 11/072,000, mail date Jun. 11, 2009, 13 pages.

Office Action for U.S. Appl. No. 11/072,000, mail date Nov. 12, 2009, 9 pages.

Office Action for U.S. Appl. No. 11/074,368, mail date Apr. 14, 2009, 13 pages.

Office Action for U.S. Appl. No. 11/074,368, mail date Aug. 19, 2009, 12 pages.

Office Action for U.S. Appl. No. 11/074,368, mail date Mar. 26, 2008, 12 pages.

Office Action for U.S. Appl. No. 11/074,368, mail date Mar. 29, 2007, 11 pages.

Office Action for U.S. Appl. No. 11/074,368, mail date Mar. 30, 2010, 13 pages.

Office Action for U.S. Appl. No. 11/074,368, mail date Oct. 6, 2006, 8 pages.

Office Action for U.S. Appl. No. 11/074,600, mail date Feb. 18, 2009, 25 pages.

Office Action for U.S. Appl. No. 11/074,600, mail date Feb. 3, 2010, 29 pages.

Office Action for U.S. Appl. No. 11/074,600, mail date Jul. 16, 2009, 27 pages.

Office Action for U.S. Appl. No. 11/074,600, mail date Sep. 8, 2008, 13 pages.

Office Action for U.S. Appl. No. 11/075,391, mail date Apr. 8, 2008, 5 pages.

Office Action for U.S. Appl. No. 11/075,391, mail date Dec. 11, 2008, 9 pages.

Office Action for U.S. Appl. No. 11/075,391, mail date May 22, 2009, 9 pages.

Office Action for U.S. Appl. No. 11/075,392, mail date Apr. 8, 2008, 14 pages.

Office Action for U.S. Appl. No. 11/075,392, mail date Dec. 9, 2009, 13 pages.

Office Action for U.S. Appl. No. 11/075,392, mail date May 12, 2009, 13 pages.

Office Action for U.S. Appl. No. 11/075,392, mail date Nov. 13, 2008, 15 pages.

Office Action for U.S. Appl. No. 11/075,393, mail date Jun. 11, 2009, 26 pages.

Office Action for U.S. Appl. No. 11/075,393, mail date May 28, 2008, 9 pages.

Office Action for U.S. Appl. No. 11/075,393, mail date Nov. 24, 2009, 24 pages.

Saad et al.; "An Integrated Model for Order Release and Due-Date Demand Management," Journal of Manufacturing Technology Management, 2004, vol. 15, No. 1, 14 pages.

Staib Et Al., "Purchasing and Supply Chain Management," Air Force Journal of Logistics, Fall 2002, vol. 26, No. 3, 9 pages.

"New Pegasystems Enterprise Application Provides Central Hub for Proactively Managing Operational Exceptions,"Business Wire,(recovered from Dialog database), Feb. 3, 2004, 4 pages.

Bartle et al., "A Review of State Procurement and Contracting," Journal of Public Procurement, 2003, vol. 3, Issue 2, pp. 192-214.

Camas, "APS System Integration: More Challenges [Advanced Planned & Scheduling]," Materials Management and Distribution, Jan. 2001, 2 pages.

Chen et al., "Near-Optimal Pricing and Replenishment Strategies for a Retail/Distribution System," Operations Research, Nov./Dec. 2001, vol. 49, No. 6, pp. 839-853.

Chen et al., "Quantity and Due Date Quoting Available to Promise," Information Systems Frontier, Dec. 2001, vol. 3, No. 4, pp. 477-488.

Goodwin, "The Open-to-Buy System and Accurate Performance Measurement," International Journal of Retail & Distribution Management, Mar./Apr. 1992, vol. 20, Iss. 2, 7 pages.

Notice of Allowance for U.S. Appl. No. 10/914,614, mail date Oct. 3, 2007, 9 pages.

Notice of Allowance for U.S. Appl. No. 10/914,614, mail date Jan. 25, 2008, 7 pages.

Notice of Allowance for U.S. Appl. No. 10/932,913, mail date Nov. 16, 2009, 17 pages.

Notice of Allowance for U.S. Appl. No. 10/932,913, mail date Sep. 30, 2009, 26 pages.

Notice of Allowance for U.S. Appl. No. 10/933,127, mail date Feb. 4, 2010, 11 pages.

Notice of Allowance for U.S. Appl. No. 11/071,982, mail date Aug. 10, 2009, 15 pages.

Notice of Allowance for U.S. Appl. No. 11/075,391, mail date Aug. 31, 2009, 18 pages.

Office Action for U.S. Appl. No. 10/903,467, mail date Feb. 3, 2010, 16 pages.

Office Action for U.S. Appl. No. 10/903,467, mail date Jan. 26, 2009, 17 pages.

Office Action for U.S. Appl. No. 10/903,467, mail date Jul. 23, 2009, 17 pages.

Office Action for U.S. Appl. No. 10/903,467, mail date Jun. 11, 2008, 15 pages.

Office Action for U.S. Appl. No. 10/903,467, mail date Mar. 27, 2007, 11 pages.

Office Action for U.S. Appl. No. 10/903,902, mail date Apr. 23, 2008, 9 pages.

Office Action for U.S. Appl. No. 10/903,902, mail date Aug. 7, 2008, 8 pages.

Office Action for U.S. Appl. No. 10/903,902, mail date Feb. 12, 2009, 2 pages.

Office Action for U.S. Appl. No. 10/903,902, mail date Mar. 22, 2007, 7 pages.

Office Action for U.S. Appl. No. 10/903,902, mail date Sep. 13, 2007, 8 pages.

Office Action for U.S. Appl. No. 10/915,263, mail date Apr. 12, 2010, 14 pages.

Office Action for U.S. Appl. No. 10/915,263, mail date Apr. 14, 2009, 12 pages.

Office Action for U.S. Appl. No. 10/915,263, mail date Apr. 28, 2008, 16 pages.

Office Action for U.S. Appl. No. 10/915,263, mail date Jul. 23, 2007, 15 pages.

Office Action for U.S. Appl. No. 10/915,263, mail date Sep. 12, 2008, 11 pages.

Office Action for U.S. Appl. No. 10/915,263, mail date Sep. 9, 2009, 13 pages.

Office Action for U.S. Appl. No. 10/915,707, mail date Apr. 13, 2009, 6 pages.

Office Action for U.S. Appl. No. 10/915,707, mail date Apr. 21, 2006, 9 pages.

Office Action for U.S. Appl. No. 10/915,707, mail date Aug. 28, 2006, 13 pages.

Office Action for U.S. Appl. No. 10/915,707, mail date Dec. 8, 2008, 5 pages.

Office Action for U.S. Appl. No. 10/915,707, mail date Mar. 16, 2010, 13 pages.

Office Action for U.S. Appl. No. 10/915,707, mail date Mar. 28, 2007, 13 pages.

Office Action for U.S. Appl. No. 10/915,707, mail date May 1, 2008, 14 pages.

Office Action for U.S. Appl. No. 10/915,707, mail date Sep. 14, 2009, 11 pages.

Office Action for U.S. Appl. No. 10/932,913, mail date Apr. 1, 2009, 15 page.

Office Action for U.S. Appl. No. 10/932,913, mail date Aug. 27, 2007, 14 pages.

Office Action for U.S. Appl. No. 10/932,913, mail date Jan. 23, 2007, 15 pages.

Office Action for U.S. Appl. No. 10/932,913, mail date Mar. 20, 2008, 14 pages.

Office Action for U.S. Appl. No. 10/932,913, mail date Sep. 17, 2008, 14 pages.

Office Action for U.S. Appl. No. 10/933,127, mail date Aug. 3, 2009, 26 pages.

Office Action for U.S. Appl. No. 10/933,127, mail date Jul. 16, 2008, 10 pages.

Office Action for U.S. Appl. No. 10/933,127, mail date Jul. 3, 2007, 5 pages.

Office Action for U.S. Appl. No. 10/933,127, mail date Nov. 28, 2007, 7 pages.

Office Action for U.S. Appl. No. 10/981,384, mail date Apr. 29, 2009, 10 pages.

Office Action for U.S. Appl. No. 10/981,384, mail date Mar. 14, 2008, 7 pages.

Office Action for U.S. Appl. No. 10/981,384, mail date Nov. 23, 2009, 10 pages.

Office Action for U.S. Appl. No. 10/981,384, mail date Oct. 16, 2008, 7 pages.

* cited by examiner

Change View "Control Table for Grouping": Details

| Purchasing Doc. Type | NB | Standard PO |
|---|---|---|
| Control Table for Grouping | | |
| Take Account of Purch. Group | Each Time Document is Processed in Fashion Environment | |
| Take Account of Plnt | Each Time Document is Processed in Fashion Environment | |
| Take Account of Contract | Each Time Document is Processed in Fashion Environment | |
| Take Account of Item Categ. | Inactive | |
| Take Account of Firm Deals | Each Time Document is Processed in Fashion Environment | |
| Take Account of OTB Bckt | Inactive | |
| Take Account of Alloc. Table | For Grouping Process | |
| Take Account of Dlvy Period | Inactive | |
| Take Account of Dlvy Date | Each Time Document is Processed in Fashion Environment | |

FIG. 2

| Box | No. | Item | Origin. | Article (Variant, lot) | Latest PO date | Vendor | Deliverz Date GR Ramp | Price | Quantity | UoM | Site |
|---|---|---|---|---|---|---|---|---|---|---|---|
| ¢ | 12345678 | 10 | EKL | 4711100 | 13/09/2002 | 100006 | 01/03/2003 | 1000 | 100 | CAR | VZ01 |
| ¢ | 12345678 | 20 | EKL | 4711200 | 20/09/2002 | 200003 | 15/03/2003 | 500 | 10 | CAR | VZ01 |
| ¢ | 12345678 | 30 | EKL | 4713001 | 23/09/2002 | 100006 | 20/03/2003 | 69 | 1 | PC | VZ01 |
| ¢ | 12345678 | 40 | EKL | 4713002 | 23/09/2002 | 100006 | 20/03/2003 | 69 | 1 | PC | VZ01 |
| ¢ | 12345678 | 50 | EKL | 4713003 | 23/09/2002 | 100006 | 20/03/2003 | 69 | 1 | PC | VZ01 |
| ¢ | 98765432 | 10 | EKL | 4714001 | 23/09/2002 | 200004 | 30/09/2003 | 89 | 1 | PC | VZ01 |
| ¢ | 98765432 | 20 | EKL | 4714002 | 25/09/2002 | 200004 | 30/09/2003 | 89 | 1 | PC | VZ01 |
| ¢ | 98765432 | 30 | EKL | 4714003 | 25/09/2002 | 200004 | 30/09/2003 | 89 | 1 | PC | VZ01 |
| ¢ | 98765432 | 40 | EKL | 4714004 | 25/09/2002 | 200004 | 30/09/2003 | 89 | 1 | PC | VZ01 |
| ¢ | 98765432 | 50 | EKL | 4714005 | 25/09/2002 | 200004 | 30/09/2003 | 89 | 1 | PC | VZ01 |
| ¢ | $0000001 | 10 | ADH | 471500 | 23/09/2002 | 100006 | 25/06/2003 | 10 | 25 | CAR | VZ01 |
| ¢ | $0000002 | 10 | ADH | 471600 | 23/09/2002 | 100006 | 23/04/2003 | 20 | 80 | CAR | VZ01 |
| ¢ | $0000002 | 20 | ADH | 480000 | 20/10/2002 | 100006 | 23/04/2003 | 30 | 20 | PC | VZ01 |
| ¢ | $0000003 | 10 | ADH | 491200 | 20/10/2002 | 100006 | 23/04/2003 | 10 | 120 | CAR | VZ01 |

| Box | No. | Item | Ortin | Article (Variant, Lot= | Latest PO Date | Vendor | Delivery Date, GR Ramp | Price | Currency | Quantity | UoM | Site | Order No. | PO Item | Status |
|---|---|---|---|---|---|---|---|---|---|---|---|---|---|---|---|
| < | 12345678 | 10 | EKL | 4711100 | 13/09/2002 | 100006 | 01/03/2003 | 1000 | EUR | 100 | CAR | VZ01 | 4500000000 | 00010 | |
| < | 12345678 | 20 | EKL | 4712200 | 20/09/2002 | 200003 | 15/03/2003 | 500 | EUR | 10 | CAR | VZ01 | 4500000001 | 00010 | |
| < | 12345678 | 30 | EKL | 4713001 | 23/09/2002 | 100006 | 20/03/2003 | 69 | EUR | 1 | PC | VZ01 | 4500000002 | 00010 | |
| < | 12345678 | 40 | EKL | 4713002 | 23/09/2002 | 100006 | 20/03/2003 | 69 | EUR | 1 | PC | VZ01 | 4500000002 | 00020 | |
| < | 12345678 | 50 | EKL | 4713003 | 23/09/2002 | 100006 | 20/03/2003 | 69 | EUR | 1 | PC | VZ01 | 4500000002 | 00030 | |
| < | 98765432 | 10 | EKL | 4714001 | 23/09/2002 | 200003 | 20/03/2003 | 89 | EUR | 1 | PC | VZ01 | 4500000003 | 00010 | |
| < | $0000001 | 10 | ADH | 4711500 | 23/09/2002 | 100006 | 25/06/2003 | 10 | EUR | 25 | CAR | VZ01 | 4500000004 | 00010 | |
| < | $0000002 | 10 | ADH | 4711600 | 23/09/2002 | 100006 | 23/04/2003 | 20 | EUR | 80 | CAR | VZ01 | 4500000005 | 00010 | |

PURCHASE LIST HAVING STATUS INDICATORS

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND

The present description relates generally to the field of managing purchase orders. More particularly, the present description relates to a purchase list for managing purchase orders.

Providers of retail sales articles and services must seek to provide the right product, at the right place, at the right time. Particularly, with regard to sales of retail fashion articles, these articles often have a short life cycle, and new articles have to be presented quite frequently. At the same time, the consumers demand a wide assortment variety. Accordingly, large numbers of different fashion articles often have to be processed and procured within extremely short time frames.

Further, tracking inventory and budgets for seasonal items can be important to the profitability of a business. For example, identifying a particularly fast selling item and ordering additional quantities to arrive on time and within a prescribed budget may increase the profitability of a retail location. Accordingly, it is important for a business to carefully plan and schedule purchasing orders for retail sales articles and services to ensure on-time procurement or scheduling within budget constraints. Optimizing the smooth flow of the procurement process increases an enterprise's efficiency and competitiveness and determines its success.

In view of the foregoing, it would be beneficial to provide a purchase order list having status indicators to provide a visual indication as to whether or not a purchase order has been successfully generated for a particular sales article or grouping of sales articles. It would further be beneficial to provide a status indicator which provides an indication as to why a particular purchase order has not yet been generated, such as lack of available budget to procure the article, so that, for example, they may be modified to meet budget constraints or forwarded for special authorization.

SUMMARY

According to an exemplary embodiment, a method of indicating the status of items in one or more databases includes displaying a list of items of interest, and displaying a visual status indicator for each of the items in the list of items of interest, wherein the visual status indicator is configured to indicate the status of the item of interest.

According to another exemplary embodiment, a system for indicating the status of items in one or more databases includes means for displaying a list of items of interest, and means for displaying a visual status indicator for each of the items in the list of items of interest, wherein the visual status indicator is configured to indicate the status of the item of interest.

According to another exemplary embodiment, a program product for indicating the status of items in one or more databases includes machine-readable program code for causing, when executed, one or more machines to perform the method steps of displaying a list of items of interest, and displaying a visual status indicator for each of the items in the list of items of interest, wherein the visual status indicator is configured to indicate the status of the item of interest.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 2 illustrates a graphical user interface screen for selecting grouping criteria according to an exemplary embodiment;

FIG. 5 illustrates the structure of a purchase order list according to an exemplary embodiment;

FIG. 7 illustrates the structure of a selection screen according to another exemplary embodiment.

FIG. 9 illustrates status indicator configurations according to another exemplary embodiment; and FIG. 10 illustrates the structure of a purchase order list having status indicators according to another exemplary embodiment.

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

Figure 1:
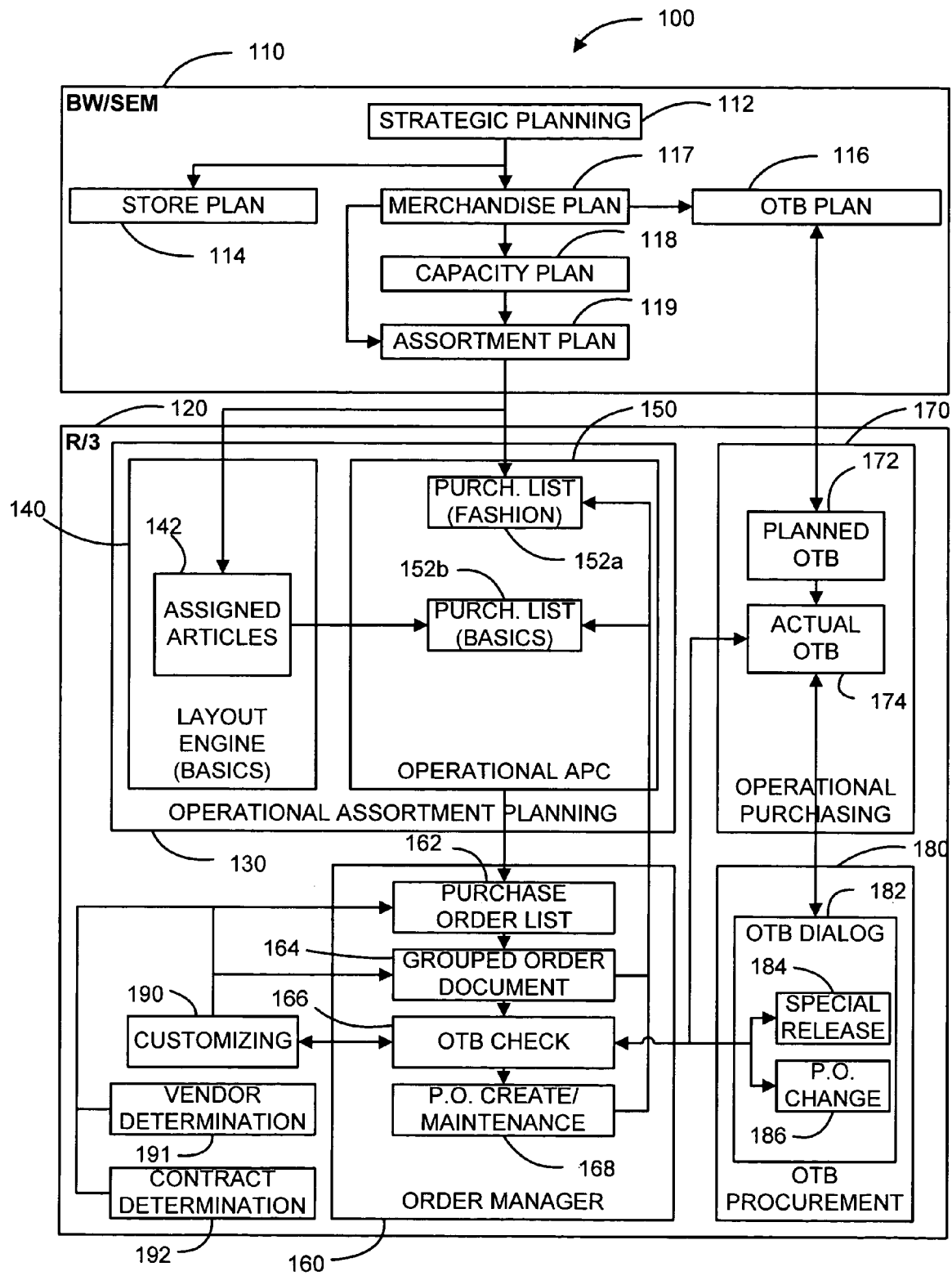
FIG. 1 is a data flow diagram illustrating a system for facilitating planning and procurement of retail sales articles and services according to an exemplary embodiment.

FIG. 1 illustrates a system 100 for facilitating planning and procurement of retail sales articles and services according to an exemplary embodiment. System 100 is illustrated as including a back end system 110 (identified as "BW/SEM") and a front end system 120 (identified as "R/3"). In another embodiment, a single integrated system may be used in place of back end system 110 and front end system 120. System 100 may be implemented as a single system, a distributed system, or any combination thereof. System 100 may be implemented using a single computing system, a plurality of computing systems, software, hardware, or any other system or combination of systems to perform the functions described herein. System 100 may be used, for example, to generate and manage purchase orders for retail sales articles and services using a purchase order list. This may include the automated determination of a pre-existing supplier contract for a particular article or group of articles to be procured.

Back end system 110 is a data repository configured to receive, sort, process, and store retail sales data, as well as to facilitate planning, provide reporting, and provide other functions associated with managing sales data using one or more functions and/or components. For example, in the illustrated embodiment, back end system 110 includes a strategic planning function 112. Strategic planning function 112 may be used to facilitate an overall business financial plan which defines the retailer's financial goals (e.g., revenues, gross margins, etc.), planned expenses (e.g., inventory, marketing, etc.), and budgets. Accordingly, strategic planning function 112 may be used to generate a store plan 114, an "Open To Buy" (OTB) plan 116, a merchandise plan 117, a capacity plan 118, and an assortment plan 119. According to other exemplary embodiments, back end system 110 may include additional, fewer, and/or different functions.

Store plan 114 may be a plan in which revenues and costs are based on factors within a store hierarchy such as regional marketing, competition, demographic shifts and preferences, and events. OTB plan 116 is derived from merchandise plan 117 and may be a plan designed to maximize turnover potential and minimize capital investment and stockholding costs. OTB planning data may include, for example, an extrapolated amount of available budget for procuring a retail sales article. Merchandise plan 117 may define target purchasing, sales, margin, and inventory levels that are consistent with the overall business plan. Capacity plan 118 is derived from merchandise plan 117 and may be a plan which takes into account the available shelf and/or floor space in a particular store or group of stores in order to determine an optimal number of certain types of retail sales articles to be procured for the store or group of stores.

Assortment plan 119 is based on merchandise plan 117 (and optionally on capacity plan 118 for certain articles) and may be a plan which defines ranges of retail sales articles (e.g., colors and sizes) that may be assigned to a particular grouping of stores. Assortment plan 119 may form the basis for selecting, procuring, and allocating quantities of particular retail sales articles. For example, in the illustrated embodiment, assortment planning data from assortment plan 119 is provided to front-end system 120 in order to facilitate generation and management of purchase orders for the associated retail sales articles.

Front end system 120 is communicatively coupled to back end system 110 and is similarly configured to receive, sort, process, and store retail sales data, as well as to facilitate planning, provide reporting, and provide other functions associated with managing sales data using one or more functions and/or components and in conjunction with back end system 110. For example, in the illustrated embodiment, front end system 120 includes operational assortment planning system 130, order manager system 160, operational purchasing system 170, and OTB procurement system 180. According to other exemplary embodiments, front-end system 120 may include additional, fewer, and/or different functions.

Operational assortment planning system 130 is configured to receive strategic planning data, such as merchandise plan data 117, capacity plan data 118, and assortment planning data 119, from back end system 110, to facilitate refinement and/or addition of detail to the strategic planning data (e.g., specific retail sales articles and quantities to be procured for specific stores during specific periods), and to distribute the data to other downstream processes. In the illustrated embodiment, operational assortment planning system 130 includes a layout engine 140 and an operative assortment planning and control (APC) engine 150. Data from layout engine 140 is passed on to APC engine 150 where it is processed and distributed to downstream processes.

Layout engine 140 is configured to receive strategic planning data from back end system 110, such as capacity data 118 and assortment planning data 119, and to use this data to assign, for example, certain types of retail sales articles to specific locations or layouts according to the available capacity in a store or group of stores. For example, in the illustrated embodiment, layout engine 140 may be used to assign basic, repeat, or "stackable" retail sales articles to a particular layout according to available capacities. In other embodiments, layout engine 140 may be used in conjunction with other types of retail sales articles. Layout data, such as assignments 142 of specific retail sales articles to a particular layout is then passed on to APC engine 150.

APC engine 150 is configured to receive strategic planning data from back end system 110 via an inbound interface, and/or assigned article data 142 from layout engine 140, and to determine groupings and quantities of specific retail sales articles that are to be procured during a specific period and delivered to a specific store or group of stores. By way of example, the following strategic planning data may be "pushed" (or written) or "pulled" (or read) by APC engine 150:

(i) Key performance indicator "fixed initial stock-up" (on a quantity and value basis: purchase price, sales price) at various levels (e.g., article hierarchy node, season/season year, rollout, global assortments assigned to the hierarchy node) Fixed initial stock-up represents fixed quantities of new merchandise to be procured from a capacity standpoint.

(ii) Key performance indicator "variable initial stock-up" on a quantity and value basis at the same levels. Variable initial stock-up represents quantities of new merchandise to be procured from a sales standpoint (e.g., forecast sales).

(iii) Key performance indicator "putaway quantity" on a quantity and value basis at various levels (e.g., article hierarchy node, season/season year, rollout, distribution center). Putaway quantity represents quantities of an article that are not to be shipped directly to a store, but rather are to be shipped to a distribution center first.

(iv) The number of different generic articles (or single articles) per key performance indicator in the assortments (assortment breadth).

APC engine 150 uses the strategic planning data received from back end system 110 and/or assigned article data 142 received from layout engine 140 to generate output data including planned assortments/store groups that, upon release, are pushed to downstream processes. Output data from APC engine 150 may also include one or more purchasing lists 152 of various types. For example, in the illustrated embodiment, APC engine 150 uses strategic planning data received from back end system 110 to generate one or more purchasing lists 152a for fashion retail sales articles, and uses assigned article data 142 from layout engine 140 to generate one or more purchasing lists 152b for non-fashion retail sales articles such as basics or stackable merchandise.

Purchasing list 152 is a list of retail sales articles and corresponding planned purchasing quantities for selected planning levels (e.g., article hierarchy node/season, season year/rollout/assortment type) in APC engine 150. Each purchasing list 152 includes one or more purchasing list items, which represent the smallest possible unit in each purchasing list. A purchasing list item may include a generic article, variants of the generic article (e.g., color or size ranges), or single articles. A purchasing list item may also include planned quantities that are planned within a purchasing list for a specific store delivery date for the various global assortments and key performance indicators. By way of example, each purchasing list item may include the following information:

(i) Purchasing list item number or identifier. This number allows communication between APC engine 150 and the various operative applications;

(ii) Article number or identifier;

(iii) Characteristic 1 (e.g., "article number-characteristic level"). A data retention level of this type allows APC engine 150 to save confirmed order quantities at the characteristic level and facilitates confirmation as to whether the order quantities for a certain characteristic value deviate from the planned quantities;

(iii) Market buying number. This number allows tracking of specific generic articles that may be moved from one purchasing list to another;

(iv) Prices (e.g., purchase price and sales price);

(v) Currencies (e.g., local currency, vendor currency);

(vi) "Price fixed" indicator. This indicator ensures that price determination is not performed for either the purchase or sales price during order processing;

(vii) Total purchase order quantity for articles—planned and actual quantities (for confirmations from the purchase order) and article/characteristic value;

(viii) Vendor. Where a vendor is not maintained by APC engine 150, the vendor may be determined from the purchase order list, as will be described below;

(ix) Supplying site (e.g., distribution center, location for delivery);

(x) Dates (e.g., store delivery date, distribution center delivery date, latest possible order date), planned and actual dates;

(xi) Fields for confirmations (e.g., confirmations from downstream processes); and (xii) Status fields for the purchasing list item (e.g., status information from downstream processes).

Order manager system 160 is configured to receive data from APC engine 150 in the form of released purchasing list items, and to generate a corresponding purchase order list 162. Items in purchase order list 162 for which a purchase order is to be generated are transferred to a grouped procurement document 164. In one embodiment, items in purchase order list 162 for which a purchase order is to be generated may be grouped together for transfer to grouped procurement document 164 according to selected criteria (e.g., by using a graphical user interface). Grouping criteria for creating and changing purchase orders may include grouping based on, for example, a delivery period, a delivery date, a contract, an OTB budget, a purchasing group, a plant or location, an item category, etc. An exemplary graphical user interface screen for selecting such grouping criteria is show in FIG. 2. According to an exemplary embodiment, these criteria may be modified or enhanced by a user of system 100.

Items may also be revised if necessary after transfer to a grouped procurement document 164. For example, in one embodiment, vendor determination function 191 and contract determination function 192 may be carried out for items in grouped procurement document 164 if these functions were not performed for purchase order list 162. Once an item has been transferred to the grouped procurement document 164, a confirmation is sent to APC engine 150 (e.g., as a status field for the corresponding purchasing list item) and the item is identified for removal from purchase order list 162 by setting a deletion indicator in the purchased list. Items identified for removal from purchase order list 162 remain, however, in purchasing list 152. Items transferred to grouped procurement document 164 may be returned to purchase order list 162 by removing the deletion indicator and sending another confirmation to APC engine 150. All items in purchase order list 162 that remain marked for deletion are deleted upon generation of a purchase order 168 from grouped procurement document 164.

Once grouped order document 164 has been prepared, order manager 160 performs an OTB check 166 to verify that budgeted funds are available such that a purchase order may be generated. If OTB check 166 is successful, a confirmation may be sent to APC engine 150 (e.g., as a status field for the corresponding purchasing list item) and order manager system 160 may then generate a purchase order 168. If OTB check 166 is not successful, a failure message may be sent to APC engine 150 (e.g., as a status field for the corresponding purchasing list item). The grouped purchase order document may then need to be modified and/or specially authorized such that a purchase order may be generated.

Operational purchasing system 170 is configured to perform OTB check 166 in conjunction with order manager system 160. Operational purchasing system 170 includes planned OTB data 172 and actual OTB data 174. Planned OTB data may include OTB plan data 116 received by operational purchasing system 170 from back end system 110. Operational purchasing system 170 uses planned OTB data 172 and actual OTB data 174 to determine whether budgeted funds are available such that a purchase order may be generated for a particular grouped order document 164.

OTB procurement system 180 is in communication with order manager system 160 and operational purchasing system 170 and is configured to provide options for successfully generating a purchase order for grouped procurement document 164 when OTB check 166 is not successful. For example, in the illustrated embodiment, OTB procurement system 180 includes OTB dialog 182, which provides options to either initiate a special release 184 or a purchase order change 186. When special release 184 is initiated, grouped procurement document 164 is forwarded to, for example, an appropriately authorized individual for approval. When purchase order change 186 is initiated, grouped procurement document 164 may be modified. Such modifications may include changes in quantities, changes in delivery dates, changes in price, etc.

Figure 3:
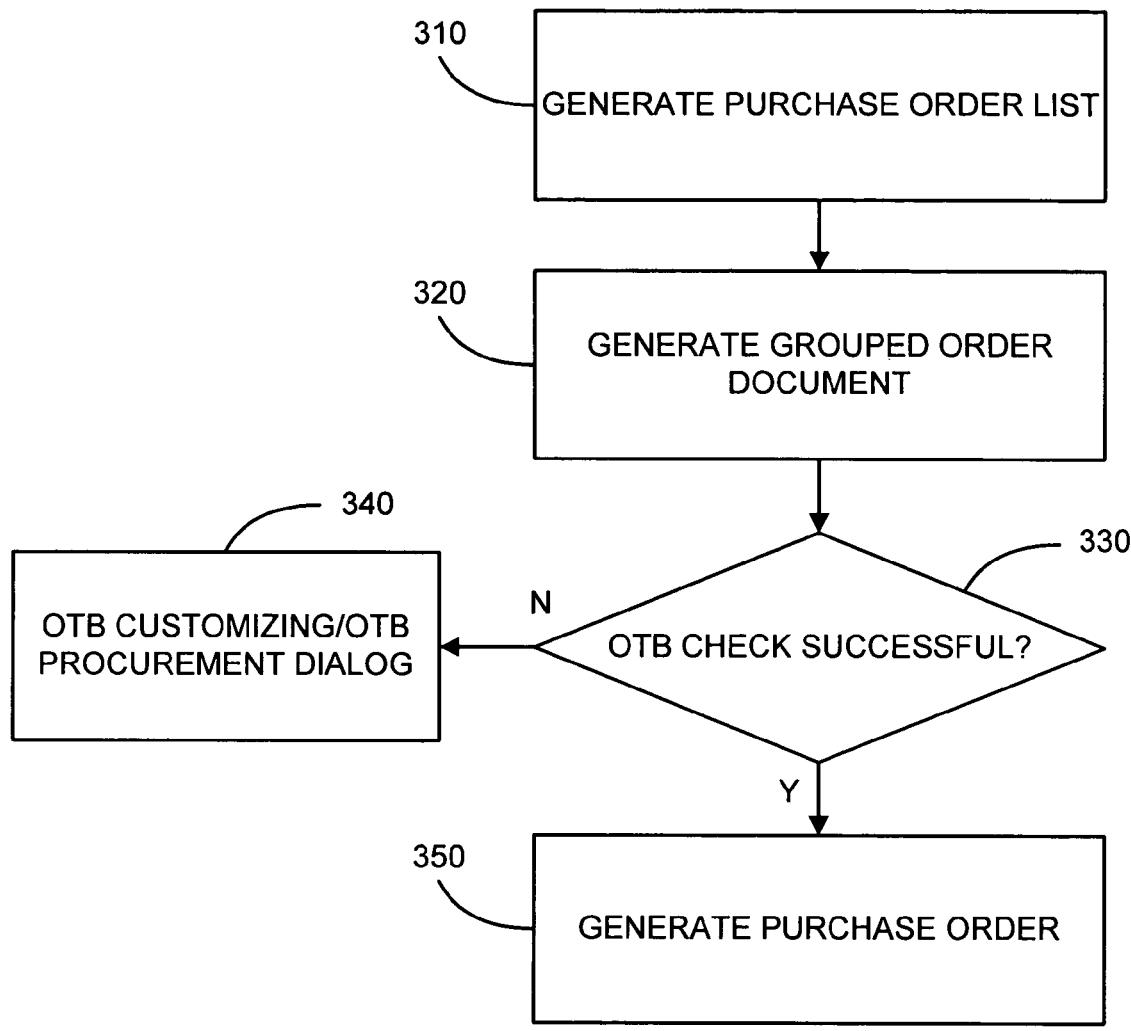
FIG. 3 is a flow diagram illustrating a method of using a purchase order list to generate a purchase order according to an exemplary embodiment.

FIG. 3 illustrates a method of using a purchase order list to generate a purchase order according to an exemplary embodiment. The process begins with a step 310. In step 310, released purchasing list items are received and a purchase order list is generated which includes a corresponding line item for each released purchasing list item. In a step 320, particular items in the purchase order list for which a purchase order is to be generated are transferred to a grouped procurement document. In a step 330, an OTB check is performed on the grouped procurement document to verify that sufficient budget is available for a purchase order to be generated. If the OTB check is not successful, the process continues with a step 340. If the OTB check is successful, the process continues with a step 350. In step 340, the grouped procurement document may be subject to modification or special approval. For example, the grouped procurement document may be subject to approval via a special release as described above, or may be subject to modifications. In one embodiment, such modifications may include changes in quantities, changes in delivery dates, changes in price, etc. In step 350, a purchase order is generated for items in the grouped procurement document.

Referring again to FIG. 1, order manager system 160 may also be configured to determine a suitable source or vendor, including selecting a relevant existing purchasing contract, for an item in purchase order list 162 as mentioned above. For example, order manager system 160 may utilize a vendor determination function 191 in order to automatically determine a suitable vendor for an item in purchase order list 162, such as items in purchase order list 162 for which relevant vendor data was not transferred from APC engine 150. Vendor determination function 191 may include a specific procedure for uniquely identifying a particular vendor (which the user may optionally designate as a preferred vendor) for an item in purchasing list 162. According to an exemplary embodiment, if vendor determination function 191 is unable to identify a unique vendor for a particular item in purchase order list 162, the user is presented with a list from which a relevant vendor for the item may be selected manually.

Order manager system 160 may also utilize a contract determination function 192 in order to determine and assign a reference or link to a relevant existing purchasing contract with the identified vendor (e.g., a vendor identified based on vendor data from APC engine 150 or by vendor determination function 191) for an item in purchase order list 162. According to an exemplary embodiment, order manager system 160 may also be configured to use contract determination function 192 to determine and assign a reference or link to a relevant existing purchasing contract for ad-hoc items or other items in purchase order list 162 for which a vendor was manually specified by a user.

As with source determination function 191, contract determination function 192 may include specific procedures for identifying a unique contract for an item in purchase order list 162. For example, in one embodiment, contract determination function 192 may be configured to utilize the oldest existing contract where there are multiple existing purchasing contracts which may be relevant to a particular item in purchase order list 162. If contract determination function 192 is able to identify a unique purchasing contract, a reference associating the purchasing contract with the item in purchase order list 162 may be generated, and the purchase price specified in the contract may be transferred from the contract to the item in purchase order list 162. According to an exemplary embodiment, the purchase price or other data specified in the purchasing contract is used automatically unless the purchase price field in purchase order list 162 cannot be manually or otherwise edited as indicated to the user by, for example highlighting or gray shading as shown in FIG. 5. Where contract determination function 192 is unable to uniquely identify a unique purchasing contract for a particular item in purchase order list 162, a contract may be identified manually. According to an exemplary embodiment, for example, if contract determination function 192 is unable to identify a unique purchasing contract for a particular item in purchase order list 162, the user is presented with a list from which a relevant existing purchasing contract may be selected manually.

According to an exemplary embodiment, a user may activate or deactivate contract determination function 192 in order manager system 160 based on a customized setting in customizing engine 190. For example, in one embodiment, customizing engine 190 may include a purchase order handling setting which may be set to "ON" in order to activate contract determination function 192, and to "OFF" in order to deactivate contract determination function 192.

Figure 4:
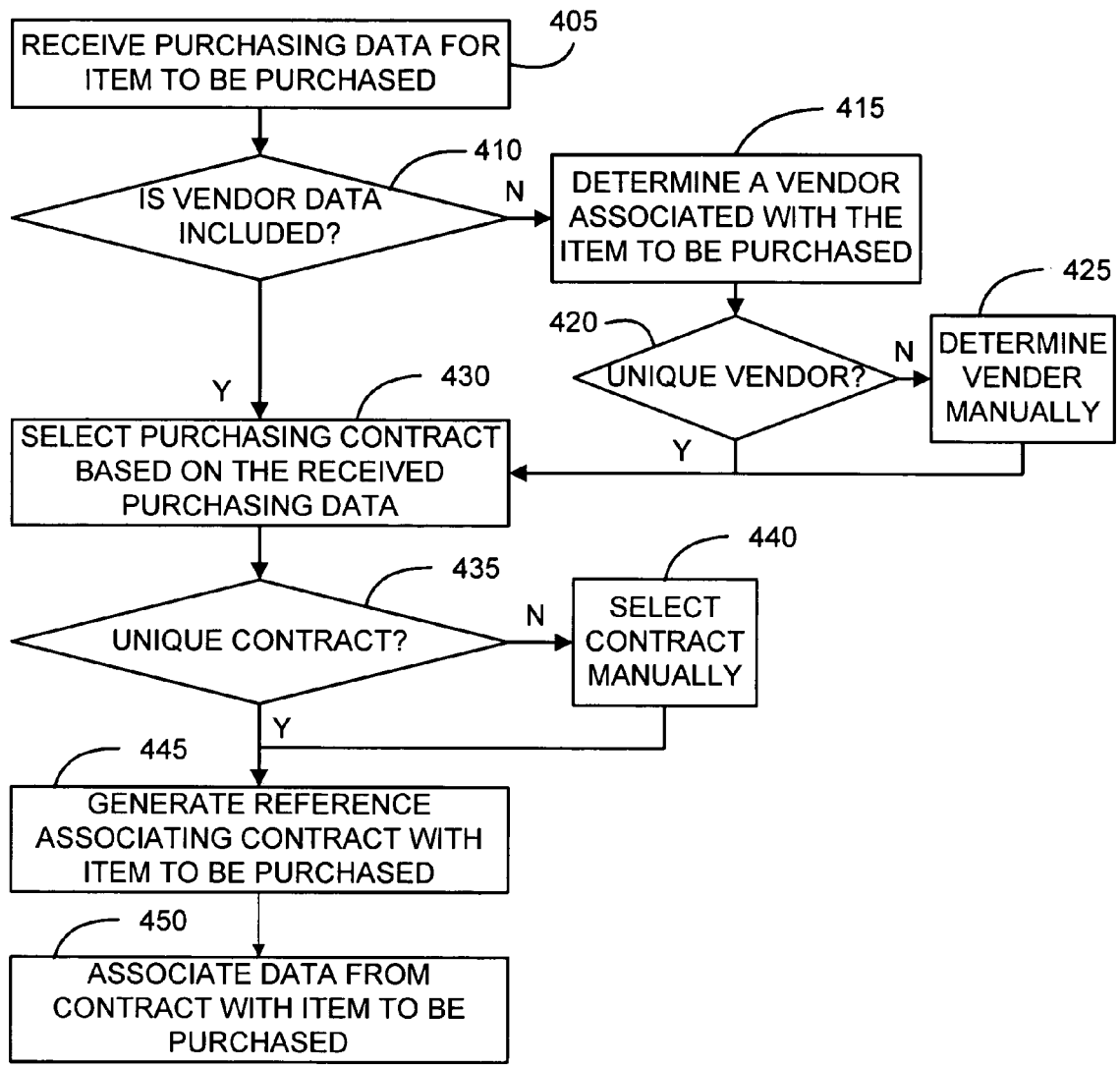
FIG. 4 is a flow diagram illustrating a method of associating a purchasing contract with an item to be purchased according to an exemplary embodiment.

FIG. 4 illustrates a process of associating a purchasing contract with an item to be purchased according to an exemplary embodiment. The process begins with a step 405. In step 405 purchasing data is received for an item to be purchased. The purchasing data may be received from, for example, APC engine 150 (shown in FIG. 1), or from an ad-hoc item entry. In a step 410, if vendor data for the item to be purchased is included in the received purchasing data, the process continues with step a 430. If vendor data is not received, the process continues with a step 415.

In step 415, a vender associated with the item to be purchased is determined. According to an exemplary embodiment, the vender associated with the item to be purchased is automatically determined using vendor determination function 191 (shown in FIG. 1). In a step 420, if a unique vendor is determined, the process continues with step 430. If a unique vendor is not determined (e.g., multiple vendors exist or no vendor is identified), then the process continues with a step 425. In step 425, a vendor for the item to be purchased is determined manually. According to an exemplary embodiment, a vendor for the item to be purchased is determined manually by a user from a list of possible vendors for the item to be purchased. Once a vendor has been manually determined, the process continues with step 430.

In step 430, a purchasing contract is selected for the item to be purchased based on the received purchasing data. According to an exemplary embodiment, the purchasing contract associated with the item to be purchased is automatically selected using contract determination function 192 (shown in FIG. 1). In a step 435, if a unique purchasing contract is determined, the process continues with a step 445. If a unique purchasing contract is not determined (e.g., multiple purchasing contracts exist or no purchasing contract is identified), then the process continues with a step 440. In step 440, a purchasing contract for the item to be purchased is selected manually. According to an exemplary embodiment, a purchasing contract for the item to be purchased is selected manually by a user from a list of possible purchasing contracts for the item to be purchased. Once a vendor has been manually selected, the process continues with step 445.

In step 445, a reference associating the selected purchasing contract with the item to be purchased is generated. In a step 450, data from the selected purchasing contract may be associated with the item to be purchased. For example, according to an exemplary embodiment, the purchase price specified in the purchasing contract may be transferred from the purchasing contract to the item to be purchased in purchase order list 162 (shown in FIG. 1).

FIG. 5 illustrates the structure of a purchase order list 500 which may be displayed to a user as part of a graphical user interface according to an exemplary embodiment. In the illustrated embodiment, purchase order list 500 is formatted as a table. Purchase order list 500 includes a header row 501 as well as a row 502 for each purchasing list item added to the purchase order list. For example, in the illustrated embodiment, purchase order list 500 includes rows 502*a*-502*n*. Purchase order list 500 also includes columns 504 for relevant purchasing data associated with each purchasing list item in the purchase order list. For example, in the illustrated embodiment, purchase order list 500 includes columns 504*a*-504*k*. Column 504*a*, labeled "No." in header row 501, includes the purchase list number from which the purchase order list line item was generated. For example, the purchase order list line items in rows 502*a*-502*e* were all generated from purchasing list number 12345678. Column 504*b*, labeled 'Item" in header row 501, includes the purchasing list line item number for each purchasing list item in the purchase order list. For example, the purchase order list line items in rows 502*a*-502*e* represent line items 10-50 from purchasing list number 12345678. Column 504c, labeled "Origin" in header row 501, includes the origin of each purchase order list line item. The origin may come from the purchase list, an external system, or may be input manually. Column 504d, labeled "Article" in header row 501, includes the specific article number for each purchase order list line item. Column 504e, labeled "Latest PO Date" in header row 501, lists the latest possible date that a purchase order may be generated for each purchase order list line item. Column 504f, labeled "Vendor" in header row 501, lists the vendor for each purchase order list line item. Column 504g, labeled "Delivery Date GR Ramp" in header row 501, includes the required delivery date for each purchase order list line item. Column 504h, labeled "Price" in header row 501, includes the price for each purchase order list line item. Column 504i, labeled "Quantity" in header row 501, includes the required quantity for each purchase order list line item. Column 504j, labeled "UoM" in header row 501, includes the appropriate unit of measure for each purchase order list line item (e.g., cartons, pieces, etc.) Column 504k, labeled "Site" in header row 501, lists the delivery destination for each purchase order list line item. Of course, in other embodiments, additional, fewer, and/or different columns and rows of information or data may be displayed.

Figure 6:
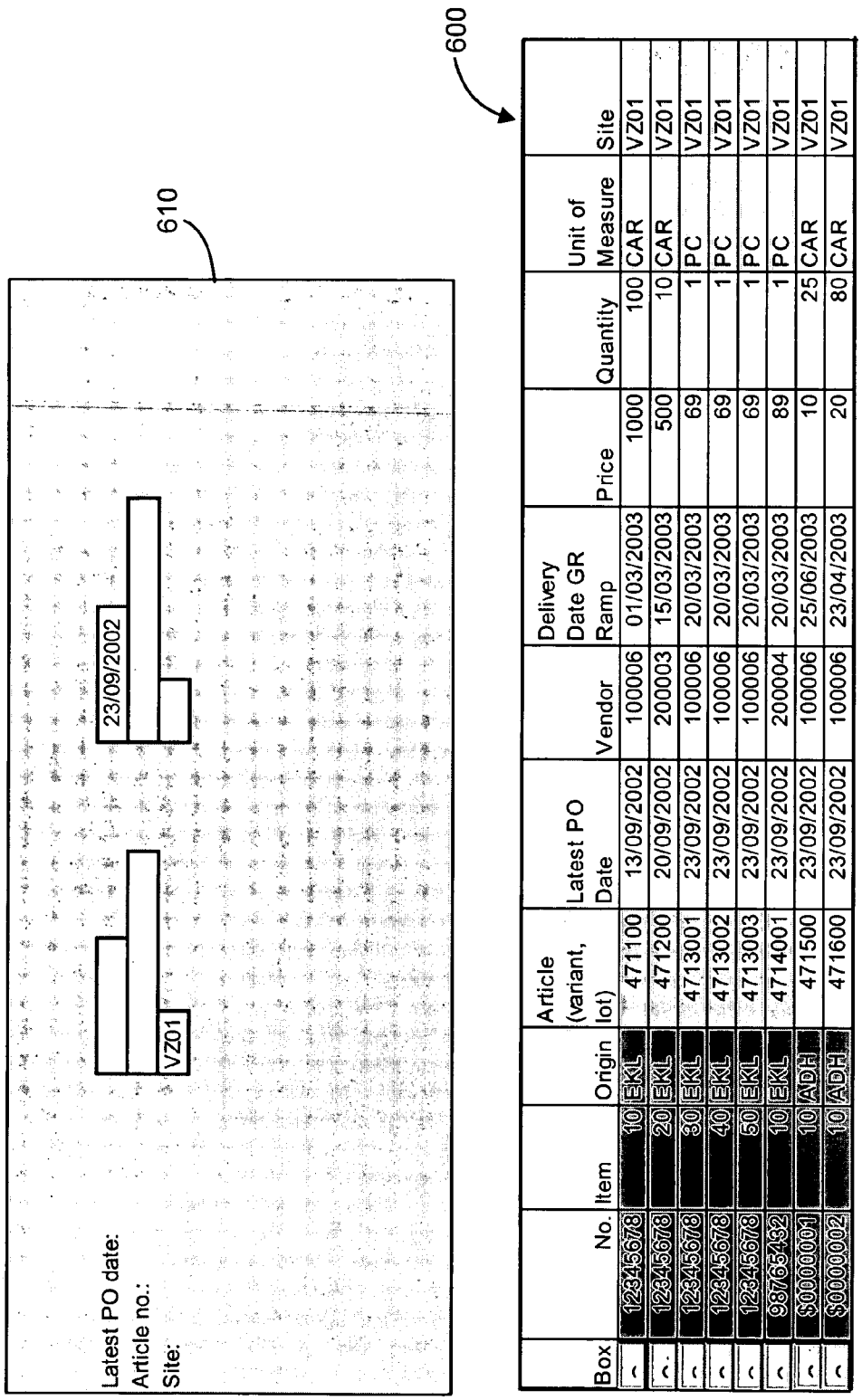
FIG. 6 illustrates the structure of a selection screen and purchase order list according to an exemplary embodiment.

Purchase order list line items may be selectively accessed and displayed. For example, FIG. 6 illustrates a purchase order list 600 and a selection screen 610 which may be displayed as part of the graphical user interface in order to facilitate the selective accessing of purchase order list line items according to specific criteria according to an exemplary embodiment. Such criteria may include categories of relevant purchasing data associated with each purchasing list item in purchase order list 600. In the illustrated embodiment, the categories "Latest PO Date," "Article No.," and "Site" may be used in selection screen 610 to selectively access purchase order list line items. For example, in the illustrated embodiment, where the Latest PO Date "23 Sep. 2002" and the Site "VZ01" are entered in selection screen 610, purchase order list 600 is displayed including only those purchase order list line items corresponding to site VZ01 with a latest PO date prior to or on 23 Sep. 2002.

Figure 7:
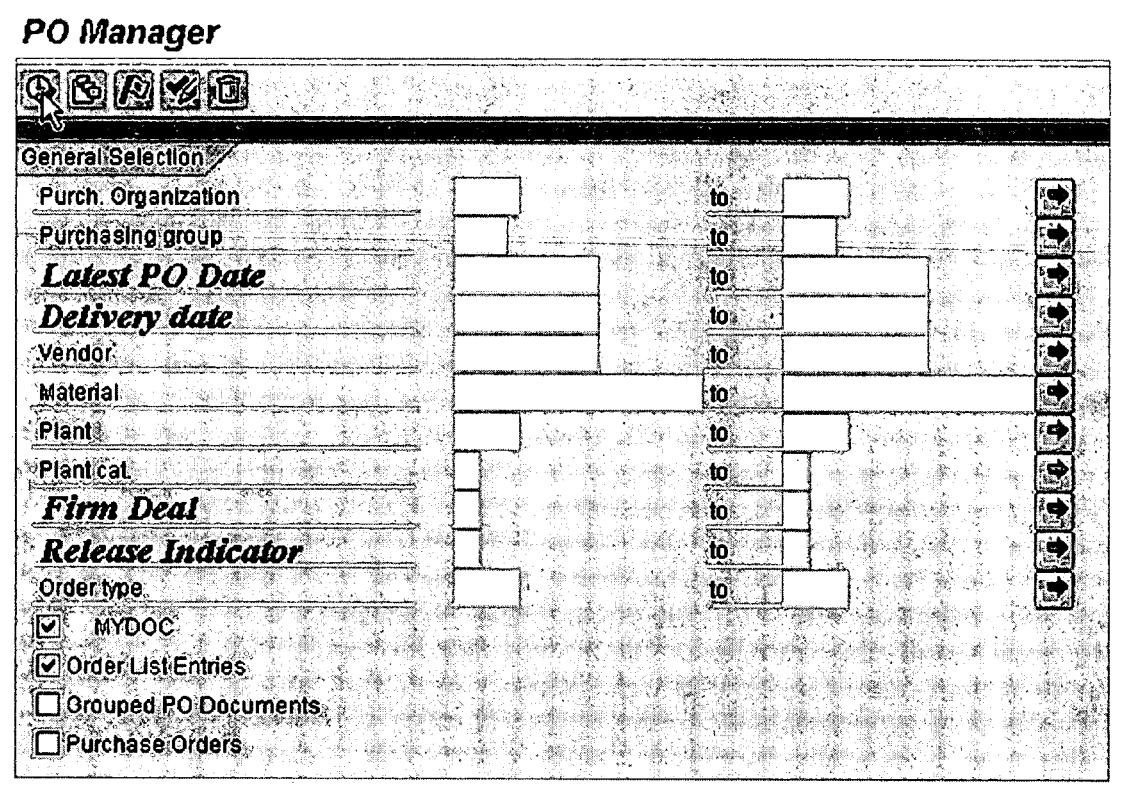

FIG. 7 illustrates a selection screen according to another exemplary embodiment. In this embodiment, additional categories include "Purchasing Organization," Purchasing Group," "Vendor," "Material," "Plant," "Plant Category," "Delivery Date," "Firm Deal," "Release Indicator," and "Order Type."

Figure 8:
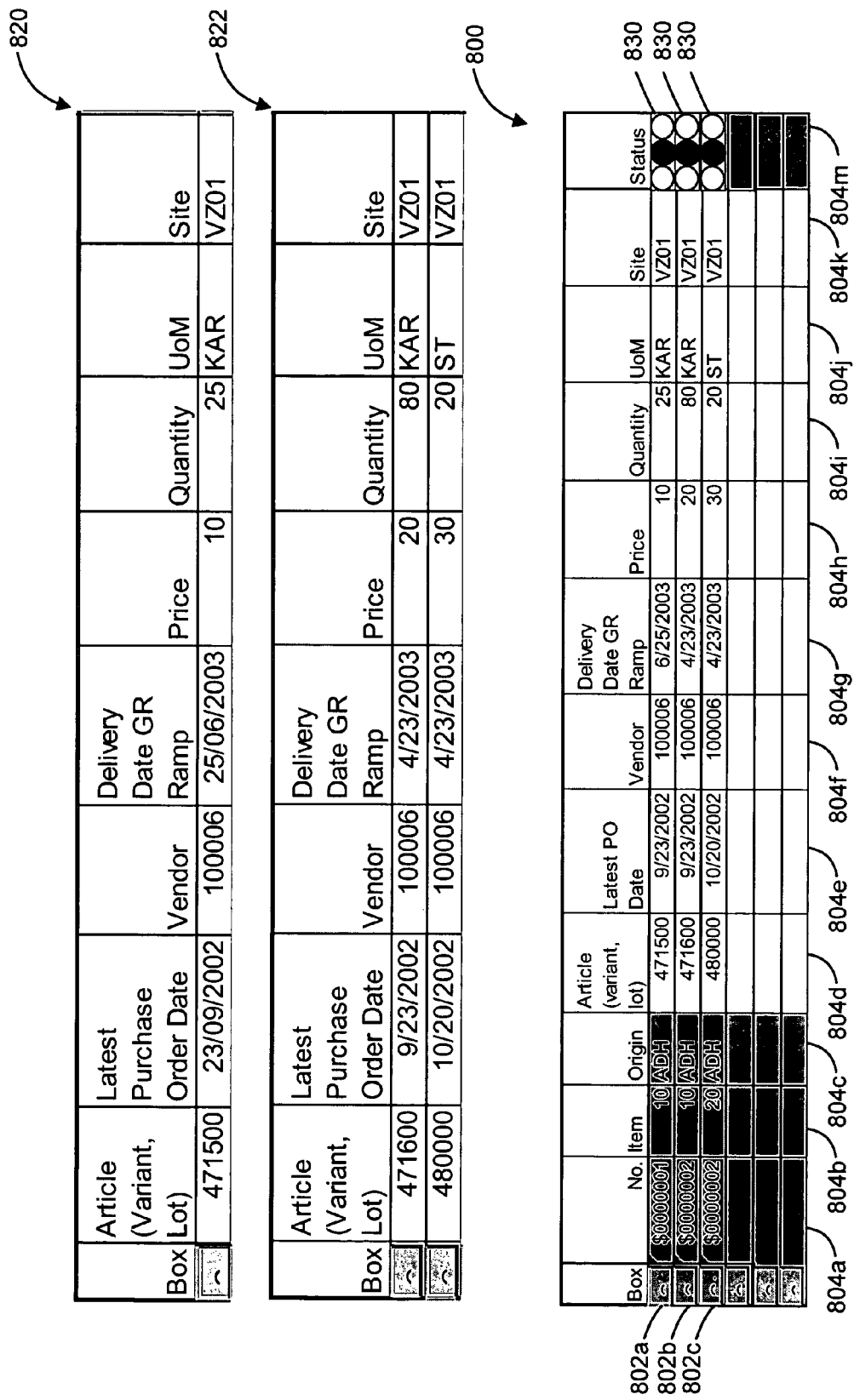
FIG. 8 illustrates the structure of a purchase order list having status indicators according to an exemplary embodiment.

FIG. 8 illustrates the structure of a purchase order list 800 having status indicators 830 for each purchase order list line item according to an exemplary embodiment. In the illustrated embodiment, purchase order list 800 includes line items 802a, 802b, and 802c, which correspond to items from entries 820 and 822 (shown for reference). When each item is entered, purchase order list 800 adds each item as a purchase order list line item with columns 804a-804k, which contain the relevant purchasing data associated with each ad-hoc item. Purchase order list 800 also includes column 804m, which may contain an individual status identifier 830 for purchase order list line items 802a, 802b, and 802c.

Figure 9:
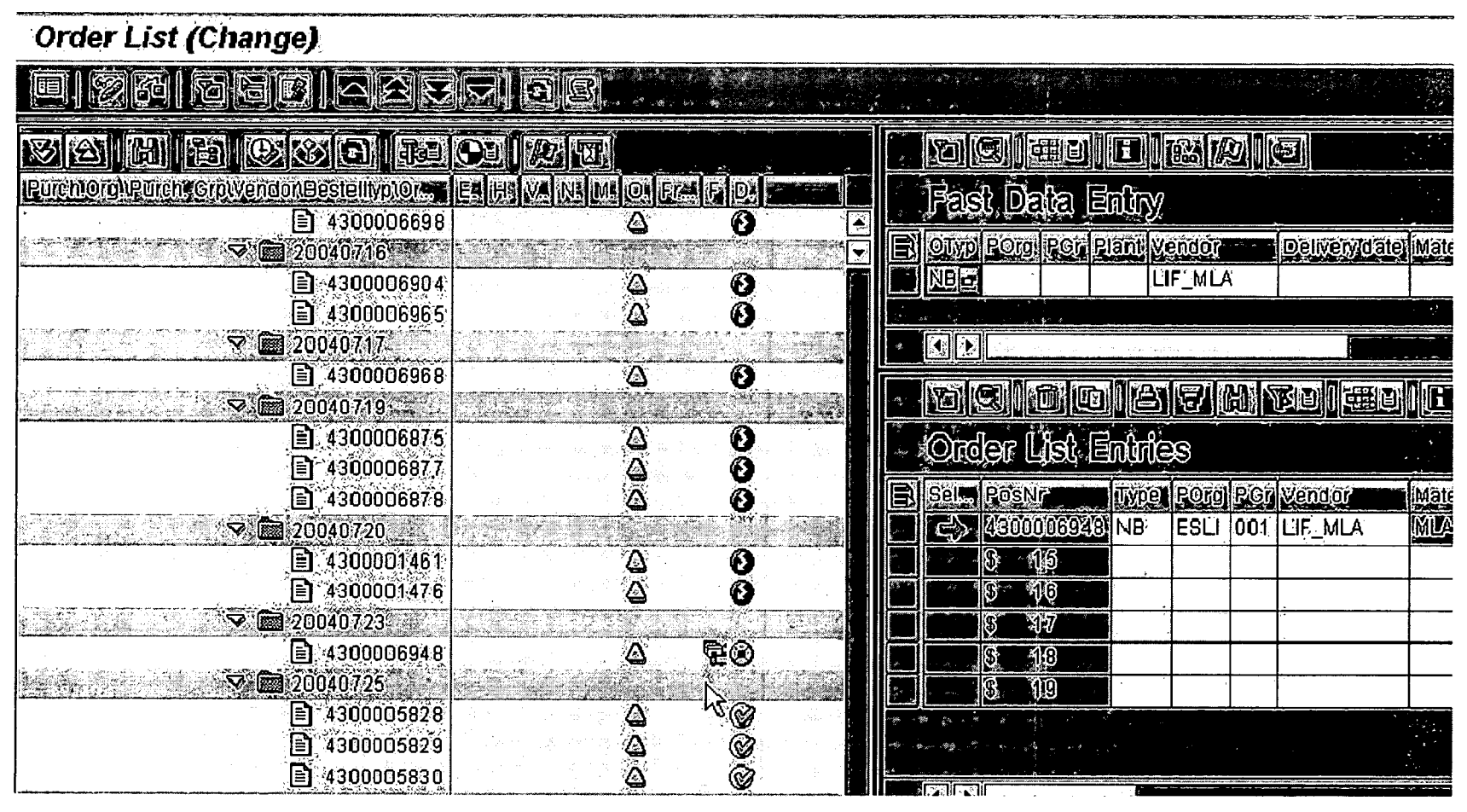

Status identifier 830 may be any of many possible configurations. In the illustrated embodiment, status identifier 830 consists of three circular areas, wherein each circular area is representative of a different status level, and the current status level is displayed by filling, highlighting, shading, or otherwise denoting the circular area corresponding to the current status (e.g., red, yellow, green colors of the circular areas). In another embodiment, status identifier 830 may include a different number of circular areas to indicate additional or fewer status levels. In yet another embodiment, status identifier 830 may include areas or icons of different shapes (e.g., square areas, triangular areas etc.) for indicating the current status. In yet another embodiment, status identifier 830 may include the use of different colors and/or changes in size or shape or other attributes of the appearance of a single area or icon, or of multiple areas or icons to indicate the current status (e.g., the use of an "X" or "check mark" or other character or symbol to modify the appearance of an area or icon). In yet another embodiment, status identifier 830 may include the use of alphanumeric text, such as a numeric scale (e.g., 1-10) to indicate the current status, wherein the number or other text indicates the current status. In yet another embodiment, a combination of area shapes, icons, colors, and/or alphanumeric text may be used to indicate a number of different possible status levels. Examples of other configurations of status indicators are shown in FIG. 9.

Referring again to FIG. 8, status identifier 830 may also indicate many different types of information. For example, in the illustrated embodiment, status indicator 830 may be used to indicate information as to whether a purchase order has been successfully generated for each line item in purchase order list 800. In this embodiment, a first one of the three circular areas may be used to indicate that a purchase order has been successfully generated for the particular line item, a second one of the three circular areas may be used to indicate that a purchase order has not yet been generated for the particular line item, and a third one of the three circular areas may be used to indicate that there is insufficient budget available to generate a purchase order (e.g., an unsuccessful OTB check). The appropriate circular area may then be filled, e.g., using one of the indication methods described above, to indicate the current status of each line item. For example, in one embodiment, a first one of the three circular areas may be displayed as filled with the color green to indicate that a purchase order has been successfully generated for the particular line item, a second one of the three circular areas may be displayed as filled with the color yellow to indicate that a purchase order has not yet been generated for the particular line item, and a third one of the three circular areas may be displayed as filled with the color red to indicate that there is insufficient budget available to generate a purchase order (e.g., an unsuccessful OTB check). In the illustrated embodiment, the middle circle has been filled to indicate that a purchase order has not yet been generated for each of the ad-hoc line items in purchase order list 800. According to various other embodiments, status identifier 800 may indicate other types of information, such as, for example, OTB information, date control information, allocation table information, firm deal information, release indicator information, etc.

FIG. 10 illustrates the structure of a purchase order list 1000 having status indicators 1030 according to another exemplary embodiment. In the illustrated embodiment, purchase order list 1000 includes a number of line items 1002 and columns 1004a-1004k, which contain the relevant purchasing data associated with each purchase order list line item. Purchase order list 1000 also includes column 1004m, which may contain an individual status identifier 1030 for purchase order list line items 1020 to identify whether a purchase order has been successfully generated for each line item. For example, in the illustrated embodiment a first one of the three circular areas has been identified to indicate that a purchase order has been successfully generated for each line item 1002.

Purchase order list 1000 further includes columns 1004n, 1004p, and 1004q. Column 1004n is labeled "Order No.," and includes the purchase order number of the successfully generated purchase order for each line item 1002 in purchase order list 1000. Column 1004*p* is labeled "PO Item," and includes the item number from a particular purchase order number for each line item 1002 in purchase order list 1000. Column 1004*q* is labeled "Currency," and denotes the type of currency (e.g., euro, dollar, etc.) used in each successfully generated purchase order.

The use of status identifiers in the purchase order list provides the advantage of a convenient visual indication as to whether or not a purchase order has been successfully generated for a particular sales article or grouping of sales articles. Using the status identifier, items that still need to be procured before a particular delivery deadline can be readily identified so that, for example, arrangements may be made to expedite procurement of the article. Further, the status indicator may also provide an indication as to why a particular purchase order has not yet been generated, such as lack of available budget to procure the article. In this way, purchase orders for which there is insufficient budget may be readily identified so that, for example, they may be modified to meet budget constraints or forwarded for special authorization.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. Computer-readable media having computer-executable instructions stored therein, the computer-executable instructions being executed by one or more processors to implement a method of managing purchase orders, the method comprising:

displaying a purchase order list, the purchase order list comprising a plurality of purchase order list items, each of the purchase order list items comprising an item price, an item quantity, a vendor identifier, and a purchase order status, wherein the purchase order status indicates a status of a purchase order associated with the respective purchase order list item;

displaying a first visual status indicator on the purchase order status of each purchase order list item for which a purchase order has been generated;

displaying a second visual status indicator on the purchase order status of each purchase order list item for which a purchase order has not been generated;

displaying a third visual status indicator on the purchase order status of each purchase order list item for which a cost for the purchase order list item exceeds a budget;

for each purchase order list item in which the cost for the purchase order list item exceeds the budget, allowing a user to request an authorization to generate the purchase order, wherein, for each purchase order list item for which authorization is obtained, the first visual status indicator on the purchase order status is displayed based on generating the purchase order; and storing at least one of the purchase order list, one or more of the plurality of purchase order list items, and one or more of the purchase order statuses of the plurality of purchase order list items.

2. The computer-readable media of claim 1, wherein the item quantity comprises a putaway quantity.

3. The computer-readable media of claim 1, wherein the method further comprises generating a store plan based on the purchase order list.

4. The computer-readable media of claim 1, wherein the method further comprises generating a merchandise plan based on the purchase order list.

5. The computer-readable media of claim 1, wherein the method further comprises generating a capacity plan based on the purchase order list.

6. The computer-readable media of claim 1, wherein the method further comprises generating a store plan and a merchandise plan based on the purchase order list.

7. The computer-readable media of claim 1, wherein, for each of the plurality of purchase order list items, a first color is related to a purchase order being generated.

8. The computer-readable media of claim 1, wherein, for each of the plurality of purchase order list items, a second color is related to a purchase order not being generated.

9. The computer-readable media of claim 1, wherein, for each of the plurality of purchase order list items, a third color is related to the cost for the purchase order list item exceeding the budget.

10. The computer-readable media of claim 1, wherein the method further comprises generating a store plan, a merchandise plan, and a capacity plan based on the purchase order list.

11. A system for managing purchase orders, the system comprising:

means for displaying a purchase order list, the purchase order list comprising a plurality of purchase order list items, each of the purchase order list items comprising an item price, an item quantity, a vendor identifier, and a purchase order status, wherein the purchase order status indicates a status of a purchase order associated with the respective purchase order list item;

means for displaying a first visual status indicator on the purchase order status of each purchase order list item for which a purchase order has been generated;

means for displaying a second visual status indicator on the purchase order status of each purchase order list item for which a purchase order has not been generated;

means for displaying a third visual status indicator on the purchase order status of each purchase order list item for which cost for the purchase order list item exceeds a budget;

means for requesting authorization to generate a purchase order for each purchase order list item in which the cost for the purchase order list item exceeds the budget, wherein, for each purchase order list item for which authorization is obtained, the first visual status indicator on the purchase order status based on generating the purchase order; and means for storing at least one of the purchase order list, one or more of the plurality of purchase order list items, and one or more of the purchase order statuses of the plurality of purchase order list items.

12. The system of claim 11, wherein the item quantity comprises a putaway quantity.

13. The system of claim 11, further comprising means for generating a store plan based on the purchase order list.

14. The system of claim 11, further comprising means for generating a merchandise plan based on the purchase order list.

15. The system of claim 11, further comprising means for generating a capacity plan based on the purchase order list.

16. The system of claim 11, further comprising means for generating a store plan and a merchandise plan based on the purchase order list.

17. The system of claim 11, wherein, for each of the plurality of purchase order list items, a first color is related to a purchase order being generated.

18. The system of claim 11, wherein, for each of the plurality of purchase order list items, a second color is related to a purchase order not being generated.

19. The system of claim 11, wherein, for each of the plurality of purchase order list items, a third color is related to the cost for the purchase order list item exceeding the budget.

20. The system of claim 11, further comprising means for generating a store plan, a merchandise plan, and a capacity plan based on the purchase order list.

21. A program product for managing purchase orders, the program product comprising machine-readable program code for causing, when executed, one or more machines to perform the following method steps:

displaying a purchase order list, the purchase order list comprising a plurality of purchase order list items, each of the purchase order list items comprising an item price, an item quantity, a vendor identifier, and a purchase order status, wherein the purchase order status indicates a status of a purchase order associated with the respective purchase order list item;

displaying a first visual status indicator on the purchase order status of each purchase order list item for which a purchase order has been generated;

displaying a second visual status indicator on the purchase order status of each purchase order list item for which a purchase order has not been generated;

displaying a third visual status indicator on the purchase order status of each purchase order list item for which cost for the purchase order list item exceeds a budget;

for each purchase order list item in which the cost for the first purchase order list item exceeds the budget, allowing a user to request an authorization to generate the purchase order, wherein, for each purchase order list item for which authorization is obtained, the first visual status indicator on the purchase order status is displayed based on generating the purchase order; and storing at least one of the purchase order list, one or more of the plurality of purchase order list items, and one or more of the purchase order statuses of the plurality of purchase order list items.

22. The program product of claim 21, wherein the item quantity comprises a putaway quantity.

23. The program product of claim 21, wherein the method further comprises generating a store plan based on the purchase order list.

24. The program product of claim 21, wherein the method further comprises generating a merchandise plan based on the purchase order list.

25. The program product of claim 21, wherein the method further comprises generating a capacity plan based on the purchase order list.

26. The program product of claim 21, wherein the method further comprises generating a store plan and a merchandise plan based on the purchase order list.

27. The program product of claim 21, wherein, for each of the plurality of purchase order list items, a first color is related to a purchase order being generated.

28. The program product of claim 21, wherein, for each of the plurality of purchase order list items, a second color is related to a purchase order not being generated.

29. The program product of claim 21, wherein, for each of the plurality of purchase order list items, a third color is related to the cost for the purchase order list item exceeding the budget.

30. The program product of claim 21, wherein the method further comprises generating a store plan, a merchandise plan, and a capacity plan based on the purchase order list.

* * * * *